(12) United States Patent
Dermer et al.

(10) Patent No.: US 7,187,471 B1
(45) Date of Patent: Mar. 6, 2007

(54) CREATING TRAPS WITH ASYMMETRIC WIDTHS

(75) Inventors: Richard A. Dermer, Issaquah, WA (US); John P. Felleman, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/458,565

(22) Filed: Dec. 9, 1999

(51) Int. Cl.
 H04N 1/409 (2006.01)
(52) U.S. Cl. ........................................ 358/1.9; 358/504
(58) Field of Classification Search ................. 358/1.9, 358/1.4, 1.12, 500–504, 515, 527, 1.15
 See application file for complete search history.

(56) References Cited

U.S. PATENT DOCUMENTS

| | | | |
|---|---|---|---|
| 4,712,119 A * | 12/1987 | Kiyohara ..................... | 347/49 |
| 4,931,861 A | 6/1990 | Taniguchi | |
| 5,295,236 A | 3/1994 | Bjorge et al. | |
| 5,313,570 A | 5/1994 | Dermer et al. | |
| 5,402,534 A | 3/1995 | Yeomans | |
| 5,412,877 A | 5/1995 | McKendrick | |
| 5,438,653 A | 8/1995 | Boenke et al. | |
| 5,542,052 A | 7/1996 | Deutsch et al. | |
| 5,579,405 A | 11/1996 | Ishida et al. | |
| 5,602,976 A | 2/1997 | Cooper et al. | |
| 5,613,046 A | 3/1997 | Dermer | |
| 5,636,337 A | 6/1997 | Boenke et al. | |

(Continued)

FOREIGN PATENT DOCUMENTS

| | | |
|---|---|---|
| EP | 0 618 718 A1 | 10/1994 |
| EP | 0 620 534 A1 | 10/1994 |

(Continued)

OTHER PUBLICATIONS

Roth, S., "Setting Traps," MacWorld, pp. 159-161, May 1991.
"The Complete Guide to Trapping," (2nd Ed.), Brian P. Lawler, 1995 Hayden Books.

*Primary Examiner*—Thomas D. Lee
*Assistant Examiner*—Stephen Brinich
(74) *Attorney, Agent, or Firm*—Fish & Richardson P.C.

(57) ABSTRACT

Methods and apparatus, including computer program apparatus, implementing techniques for preparing a region of an electronic document for printing on a printing device having asymmetric misregistration behavior. The techniques include trapping the region asymmetrically to compensate for asymmetric misregistration behavior of a printing device. The region can be an entire page or a portion of a page represented in a page description language or a raster representation. The techniques can include defining an asymmetric transformation; applying the asymmetric transformation to the region to generate a transformed region; processing the transformed region to generate transformed traps; and applying an inverse transformation to the transformed traps to generate traps for the region, the inverse transformation being an inverse of the asymmetric transformation. Defining the asymmetric transformation can be done by obtaining a first trap width magnitude and direction, the first trap width being a minimum trap width for the device; obtaining a second trap width magnitude and direction, the second trap width being a maximum trap width for the device; defining a rotational component of the asymmetric transformation by determining an angle by which a first axis of a device space has to be rotated to be aligned with the first trap width direction; and defining a scaling component of the asymmetric transformation according to a ratio of the first trap width magnitude and the second trap width magnitude.

30 Claims, 4 Drawing Sheets

U.S. PATENT DOCUMENTS

| | | | |
|---|---|---|---|
| 5,636,573 A * | 6/1997 | Brennan | 101/486 |
| 5,638,498 A | 6/1997 | Tyler et al. | |
| 5,666,543 A | 9/1997 | Gartland | |
| 5,668,931 A | 9/1997 | Dermer | |
| 5,760,779 A | 6/1998 | Yamashita et al. | |
| 5,832,127 A | 11/1998 | Healey | |
| 6,031,544 A | 2/2000 | Yhann | |
| 6,236,754 B1 | 5/2001 | Harrington | |
| 6,253,678 B1 * | 7/2001 | Wentworth | 101/181 |
| 6,262,747 B1 | 7/2001 | Rocheleau et al. | |
| 6,341,020 B1 * | 1/2002 | Rumph et al. | 358/1.9 |
| 6,366,361 B1 * | 4/2002 | Dermer et al. | 358/1.9 |
| 6,697,078 B2 | 2/2004 | Becker et al. | |
| 6,987,585 B1 | 1/2006 | Becker et al. | |
| 7,075,551 B2 | 7/2006 | Becker et al. | |
| 2004/0212628 A1 | 10/2004 | Becker et al. | |

FOREIGN PATENT DOCUMENTS

| | | |
|---|---|---|
| EP | 0 674 277 A2 | 9/1995 |
| EP | 0 840 500 | 5/1998 |
| EP | 0 901 096 | 3/1999 |
| GB | 2 291 573 A | 1/1996 |
| WO | WO95 20796 | 8/1995 |

* cited by examiner

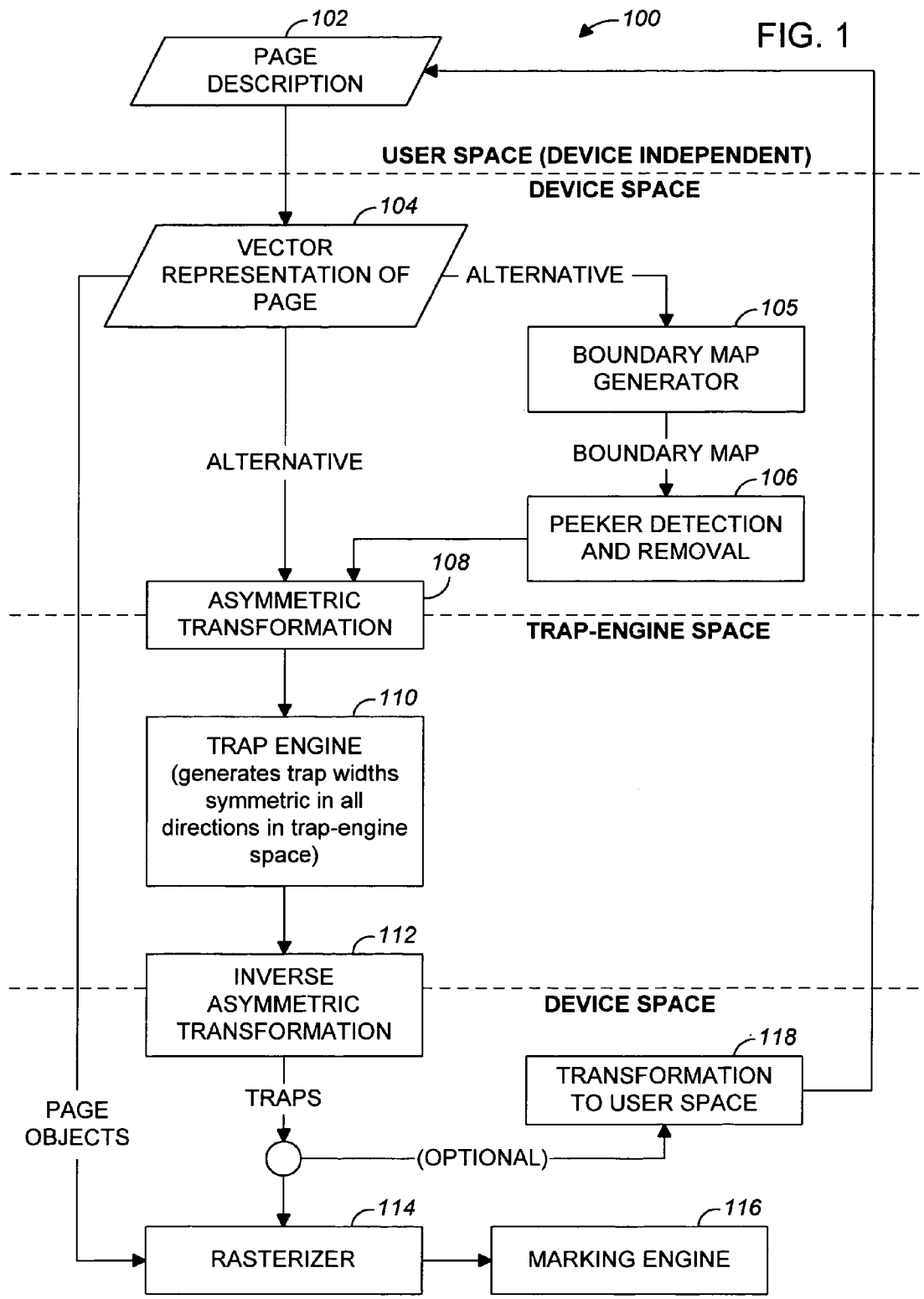

CREATING TRAPS WITH ASYMMETRIC WIDTHS

BACKGROUND OF THE INVENTION

The present invention relates to creating traps in the context of digital prepress.

Press registration is the accurate positioning of two or more colors of ink on a printed sheet. When the colors on a sheet are in register, all colors appear precisely where intended, without unintended gaps between colors or overlap of colors. Misregistration can be caused by a number of factors. One result of misregistration is unprinted paper showing through between colors, where no unprinted area was intended. Even a small registration error can result in a thin white line showing between colors on a sheet.

Trapping is the process of compensating for press misregistration by intentionally overlapping colors prior to printing. Trapping involves deciding where to place traps, and setting the size and color of traps so as to correct for possible misregistration in a way that is minimally noticeable to the human eye. Traps are generally small objects in the form of polygons. A trap is constructed by defining a rectangle along an image edge and then shaping the rectangle at its ends and along its length to conform to nearby traps and objects. The width of the initial rectangle is referred to as the trap width.

It is conventional in the electronic publishing industry to design pages using a page description language (PDL), such as the Adobe® PostScript® language, to describe a page using resolution-independent elements. (Adobe and PostScript are trademarks of Adobe Systems Incorporated of San Jose, Calif.) A PDL description of a page may be analyzed to produce a new PDL description which contains traps. The new page description may then be used to render the page, with traps, according to conventional methods. Alternatively, a page may first be rasterized and the traps may then be generated in raster form by analyzing the rasterized page. Both vector-based trapping and raster-based trapping are done automatically in prior art systems. (In this context of page description language, a vector description is one based on resolution-independent graphics primitives and is not limited to straight-line vectors.)

FIG. 4 illustrates the concepts of trapping pertinent to this specification. Two objects are to be printed over each other with different colorants: a small square 402 and a large square 404. The large square 404 has a knockout 406 for the small square. If the small square is of exactly the same size as the knockout and no misregistration occurs in printing, the small square prints within the large square with no gaps 408. If any misregistration occurs, visible substrate 410 shows through as a result of misregistration. A conventional trapping process will spread the large square 404 into the small square 402, or spread the small square 402 into the large square 404, so that the appearance of the printed page will be acceptable even when misregistration occurs.

Digital publishing systems generally provide trapping subsystems, which will be referred to as trap engines, that automatically generate traps. Traps are generated at edges between regions of different color. Conventional trap engines generate traps having symmetric trap widths—that is, the perpendicular distance a trap extends from an edge is calculated without reference to the orientation of the edge on the printed page. The trap width is selected to compensate for a maximum acceptable misregistration in the printing process for the page.

As was mentioned, some trap engines are raster-based. Raster-based trap engines generate traps, in raster or vector form, depending on the trap engine, for raster objects. As do vector-based trap engines, raster-based trap engines generate symmetric traps. Raster-based trap engines do so in a way that assumes that the raster, i.e., the printer resolution, is symmetric—that is, that the raster aspect ratio is 1:1.

One prior art Adobe® vector-based trap engine handles a printer with an asymmetric aspect ratio as follows. The engine asymmetrically converts the vector page description data into trap engine space, generates traps, and asymmetrically converts the results back to conform to the aspect ratio of the printer. However, this prior art has no ability to generate asymmetric traps to compensate for systematic asymmetric misregistration in the operation of a printing system.

SUMMARY OF THE INVENTION

In general, in one aspect, the invention provides methods and apparatus, including computer program apparatus, implementing techniques for preparing a region of an electronic document for printing on a printing device having asymmetric misregistration behavior. The techniques include trapping the region asymmetrically to compensate for asymmetric misregistration behavior of a printing device. The region can be an entire page or a portion of a page represented in a page description language or a raster representation. The techniques can include defining an asymmetric transformation; applying the asymmetric transformation to the region to generate a transformed region; processing the transformed region to generate transformed traps; and applying an inverse transformation to the transformed traps to generate traps for the region, the inverse transformation being an inverse of the asymmetric transformation. Defining the asymmetric transformation can be done by obtaining a first trap width magnitude and direction, the first trap width being a minimum trap width for the device; obtaining a second trap width magnitude and direction, the second trap width being a maximum trap width for the device; defining a rotational component of the asymmetric transformation by determining an angle by which a first axis of a device space has to be rotated to be aligned with the first trap width direction; and defining a scaling component of the asymmetric transformation according to a ratio of the first trap width magnitude and the second trap width magnitude.

Advantages that can be seen in implementations of the invention include one or more of the following. The invention allows a system to create smaller traps by not always trapping to the worst case misregistration distance. The invention allows a system to create asymmetric traps while using a conventional trap engine. The invention allows output devices having asymmetric resolution to perform peeker detection and removal in a device space, which is more accurate than doing so in trap-engine space, as was done in prior art systems.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 1 is a flowchart of a vector-based trapping process in accordance with the invention.

Like reference numbers and designations in the various drawings indicate like elements.

DETAILED DESCRIPTION

Figure 2A:
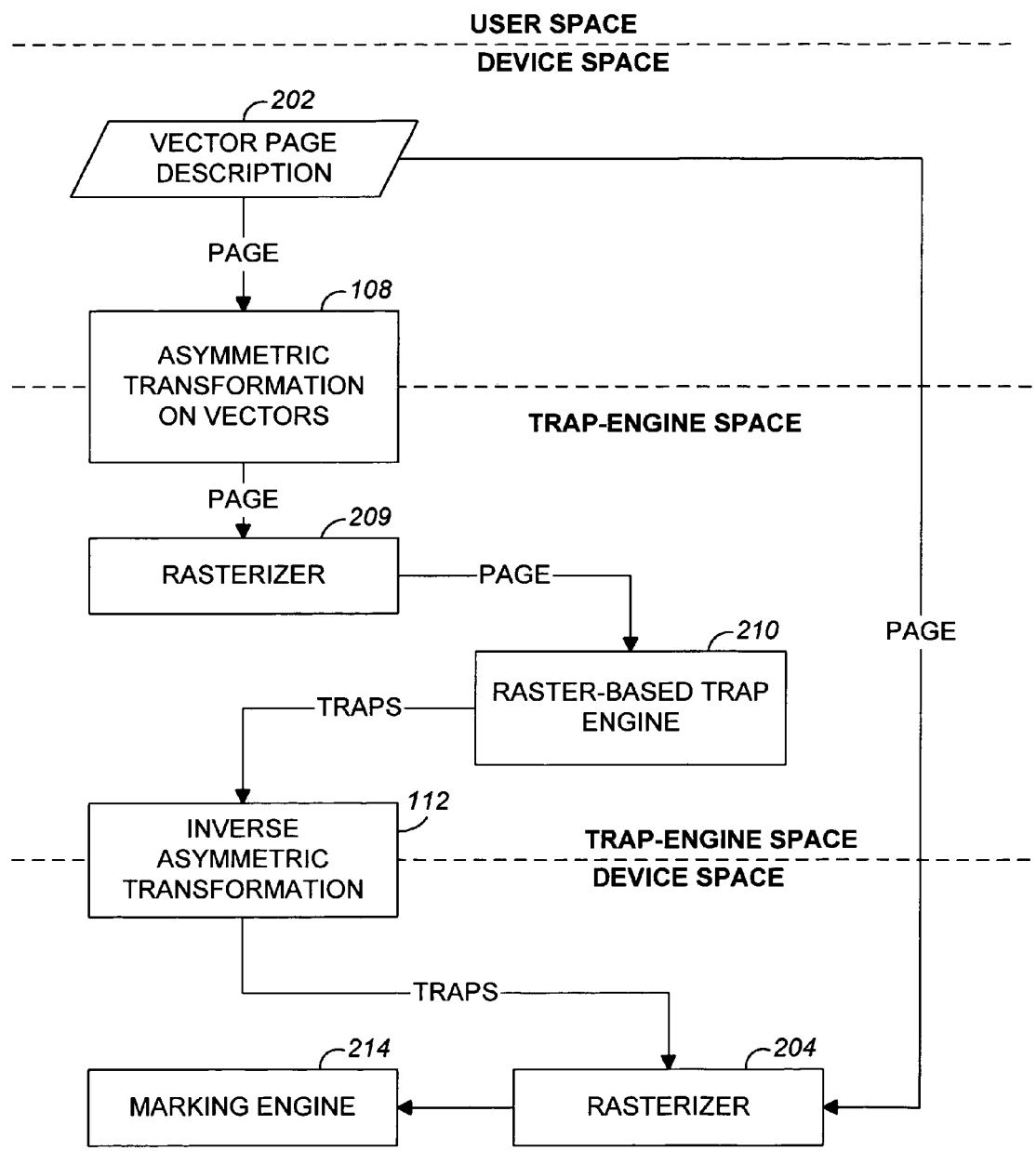
FIG. 2A and FIG. 2B, collectively referred to as FIG. 2, are views of a flowchart of a raster-based trapping process in accordance with the invention.

As has been mentioned, in generating symmetric traps, trap engines in effect assume that the printing system will misregister by the same amount in all directions However, some printing systems exhibit asymmetric misregistration behavior. Misregistration can arise from any of variety of causes in the course of any mechanical operation, such as misregistering dots on film by an imagesetter, distortion of a substrate, such as paper or film, misregistration of sequential layers of colorant on a substrate, incorrect mounting of film during plate making, incorrect mounting of plates, mechanical jitter of the press or printer as paper is fed through, or shrinkage or stretching of paper as it is fed through the printer or press. While any cause of misregistration can be asymmetric, some causes tend more than others to result in asymmetric misregistration, such as the use of roll-fed paper or the shrinkage or stretching of paper as it is fed through the press.

Asymmetric misregistration behavior can be measured empirically. As a preliminary step to performing the methods or operating the apparatus of the invention, the misregistration characteristics of the printing system are measured. In particular, a minimum trap width direction and a maximum trap width direction are found—representing generally the directions in which the printing system exhibits the least and the most misregistration—and corresponding minimum trap width magnitude and a maximum trap width magnitude are also found—representing the amount of misregistration in the minimum or maximum trap width directions. The minimum and maximum trap widths may be thought of, and will be described as, vectors defined by their respective directions and magnitudes.

FIG. 1 illustrates a process 100 implemented in a computer program for processing a page description and creating traps that are asymmetric. The input to the process is a page represented in resolution-independent form in a page description language. The page is represented in a device-independent user space. As is conventional, in a device-specific rendering process, a device-specific vector representation 104 of the page is generated. At this stage of processing, the device characteristics, such as the size of the printing elements of the device (device pixels) are known, although the page may still be represented in a vector form.

In one alternative process flow, the process 100 then applies an asymmetric transformation 108 to the vector representation of the page to create a transformed vector representation of the page. This application of the transformation 108 and the application of its inverse 112 result in the trap engine 110 producing asymmetric traps as will be described. The transformed vector representation of the page is provided to a vector-based trap engine 110 to be trapped. The trap engine—operating in its normal fashion in its trap-engine space on the transformed vector representation—generates transformed traps that are symmetric in all directions in the trap-engine space. An inverse asymmetric transformation 112 is applied to the transformed traps to obtain asymmetric traps in device space. The device-space vector representation of the objects of the page 104 and the asymmetric traps are rendered by a rasterizer 114 and sent to a marking engine 116. Optionally—and advantageously when the one expects the page to be produced later on a device having the same device space or a device have substantially the same geometric properties—the transformed traps can be converted from device space to user space (by applying transformation 118, which may be an identity transformation) and added to the page description 102, appropriately tagged for later use. This optional step can be performed in addition to, or as an alternative to, the later steps of rendering and marking.

In an alternative flow, a boundary map generator 105 is applied to the vector representation 104, and a peeker detection and removal process 106 is applied to the generated boundary map to remove any peekers on the page. A boundary map can be represented as a list of line segments, where each line segment has a left side color and a right side color. A peeker is a gap between two edges that would not appear at the resolution of the output device. Peeker removal operates on the boundary map to create an adjusted boundary map. It removes gaps between boundaries that would not appear on the output device at device resolution, so that traps are correctly generated wherever peekers exist. It also corrects boundary map color transitions so that they match color transitions that occur in the rasterized output-device form. Peeker detection and removal is described in commonly-owned U.S. patent application Ser. No. 08/922,781, the disclosure of which is incorporated here by reference.

The operations of the boundary map generator 105, if not performed elsewhere, are performed in the trap engine 110. However, the boundary map generator 105 can be applied in device space (as illustrated in FIG. 1) with or without use of a peeker removal process 106. In addition, as a further alternative, the boundary map generator 105, and peeker removal process 106 can be inserted between the asymmetric transformation 108 and the trap engine 110. In those cases where the boundary map generator 105 is treated as a separate process from the trap engine 110, what the trap engine 110 does is select and shape traps.

Some trap engines tile the page data before processing it. If peeker removal is performed in device space, it is advantageous to perform tiling first, before boundary map generation, to limit the amount of data being processed at any one time.

FIG. 2 shows an alternative implementation, in which a raster-based trap engine is used. The page description 202 in device space can be vector based. In this situation, asymmetric transformation 108 is applied, as described above. The resulting vector representation is rendered by rasterizer 209, which yields a raster of page objects in trap-engine space. The raster in trap-engine space is trapped by raster-based trap engine 210, and the appropriate inverse transformation 112 is applied to the resulting traps to yield traps in device space. The output of the inverse transformation 112 converts the traps to device space. The vector page description 202 and the transformed traps (from application of transformation 112) are rendered by a rasterizer 204 in device space, and the results are sent to a marking engine 214.

Figure 2B:
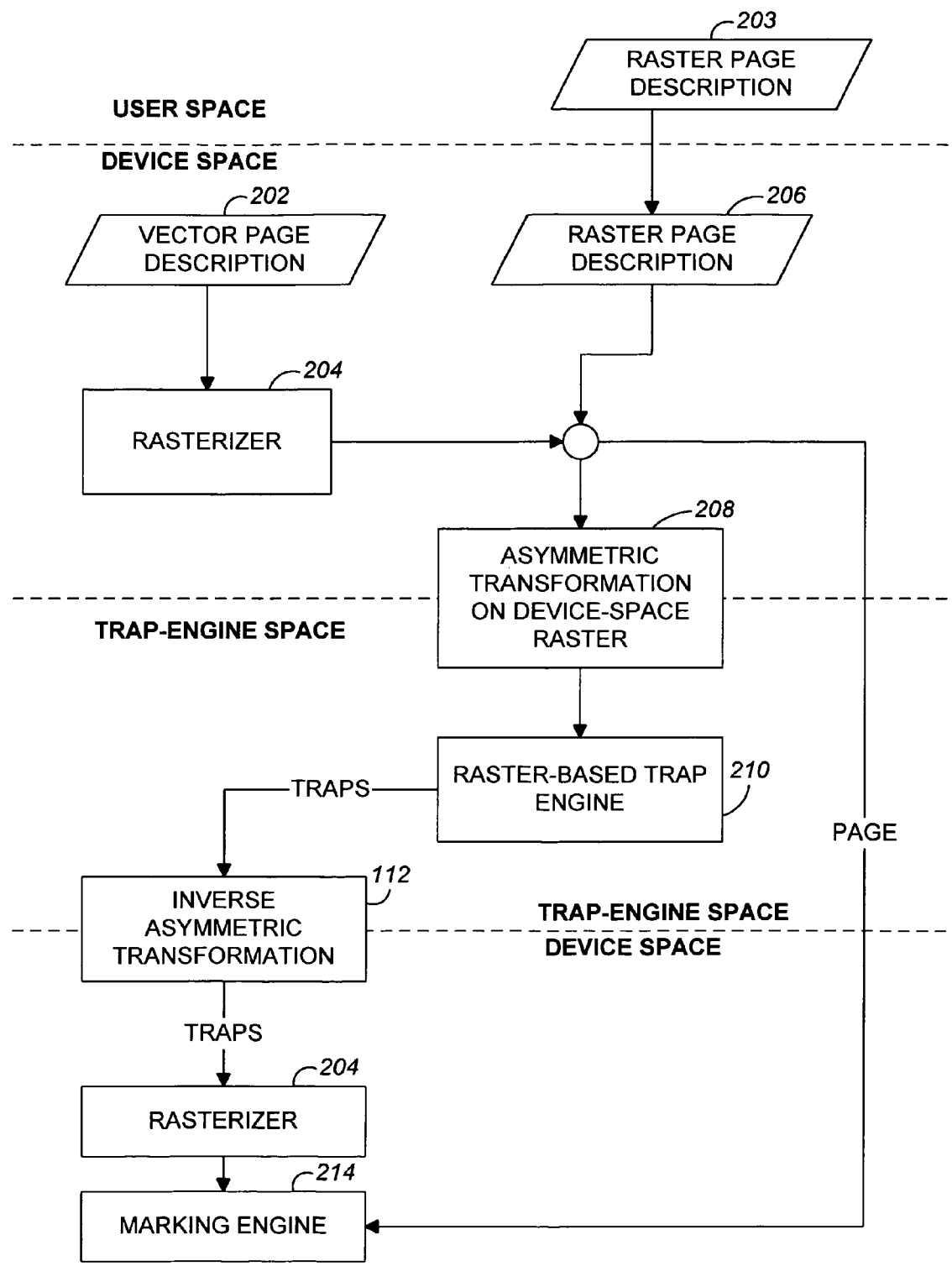

Alternatively, the page description 202 can be rendered by a rasterizer 204 in device space to yield a device-space raster, to which an asymmetric transformation 208 is applied, which yields a raster representation of the page in trap-engine space (FIG. 2B). This is trapped by the raster-based trap engine 210 and the appropriate inverse transformation 112 is applied to the resulting traps, which are rendered by the rasterizer 204. The rendered traps and the rendered page description are sent to the marking engine 214, as described above.

In a third alternative, the initial page description is a raster representation 203. This is converted to a device-space raster representation 206, which may be the same as the user-space representation. The asymmetric transformation 208 is then applied, and the process continues as described above.

The traps generated by the raster-based trap engine 210 in the alternative implementations illustrated in FIG. 2 can be added to the original input page description for later use in the same way as was illustrated in FIG. 1 and described with reference to the transformation 118 from device space to user space.

Figure 3:
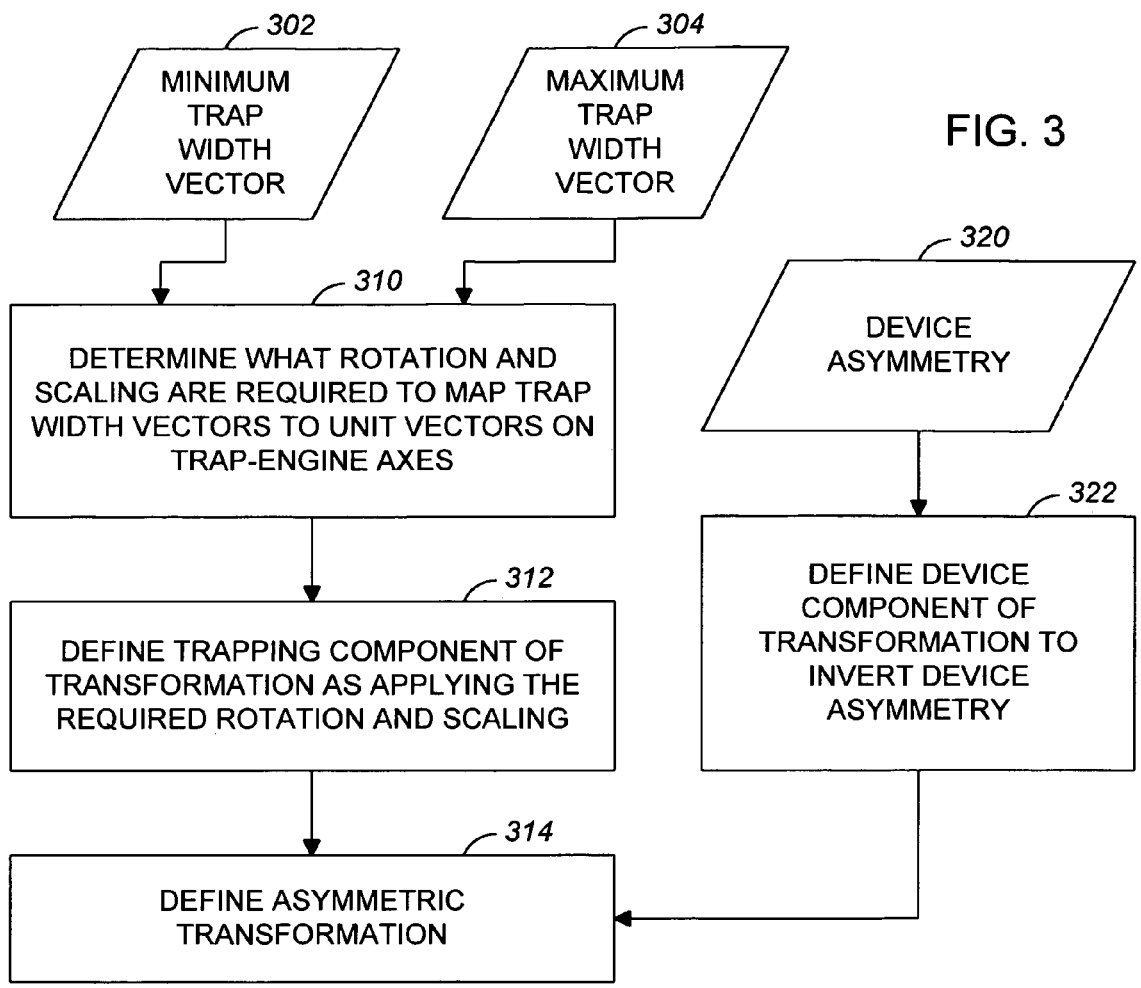
FIG. 3 is a flowchart illustrating calculation of an asymmetric transformation for the processes of FIG. 1 and FIG. 2.
Figure 4:
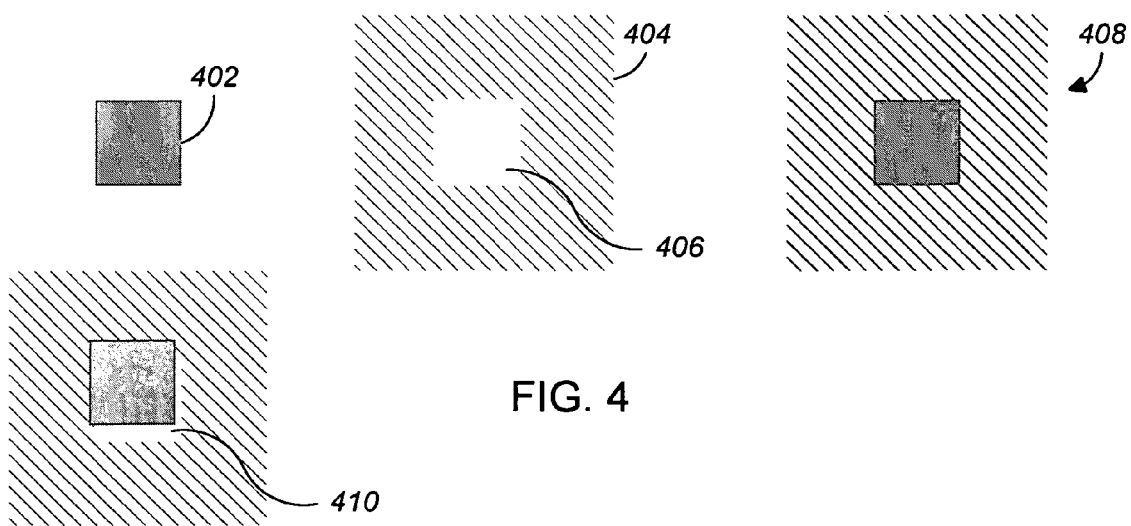
FIG. 4 illustrates the printing of objects with and without misregistration.

As shown in FIG. 3, the various asymmetric transformations that have been mentioned above can be derived from a minimum trap width vector (input 302) and a maximum trap width vector (input 304) and, if the output device has asymmetric resolution (optional input 320), from the device asymmetry as well. The trap width vectors cannot be parallel and so always constitute a basis for device space. The trapping component of an asymmetric transformation rotates and scales the trap width vectors so that they are equal to each other in length and each is parallel to a corresponding axis of a trap-engine space. (Recall that the axes of the trap-engine space are at right angles to each other and the length of a unit along both axes is the same.) The required scaling and rotation are calculated (step 310) and the trapping component is calculated from them (step 312). If the trap width vectors are not perpendicular to each other, the resulting trapping component will also include a shear transformation. The resulting component is an affine transformation that can be developed using conventional techniques and expressed as a 3×3 matrix.

If the device has asymmetric resolution (input 320), the asymmetric transformation can also include a device component (step 322) to compensate for the asymmetric resolution. Consider for example a printer (i.e., an output device, such as an imagesetter) that produces 1200 dots per inch (dpi) in the horizontal and 600 dpi in the vertical direction. A square object represented in device space would have half as many pixels in the vertical as in the horizontal direction. If device-space representation were trapped, the trap engine would generate incorrectly sized traps that print twice as high in the vertical direction as they do in the horizontal. The device component transformation compensates for this effect. For the example 600×1200 printer, the device transformation component inverts the device asymmetry by scaling device-space objects in the horizontal direction by a factor of 2.

The composition of the trapping component (from step 312) and the device component, if any (from step 322), defines the transformation (step 314) that is applied by asymmetric transformations 108 and 208 (FIGS. 1 and 2).

When applied to a raster-based representation of a page, an asymmetric transformation must interpolate or subsample raster pixels so that the required number of pixels are present along a unit length of each axis of the device space or trap-engine space.

In an alternative implementation, a trap engine and its API (application programming interface) are extended to generate asymmetric traps. Rather than a single trap width (which may be thought of as defining the diameter of a circular brush with which traps are painted), the extended API receives a minimum and maximum trap width vector (which may be thought of as defining minor and major axis or an oriented, elliptical brush for painting traps). Then, in place of using the single (circular) trap width diameter in the calculation of the distance a trap extends from an edge, the extended trap engine uses the cross section of an ellipse defined by the trap width vectors, the cross section being taken through the center of the ellipse in a direction perpendicular to the edge. The asymmetry of the desired traps can be represented in other, mathematically equivalent ways to the trap engine API, and this information can likewise be processed in any way that yields a mathematically equivalent result.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

By way of example, a print output device, such as an imagesetter, implementing an interpreter for a page description language, such as the PostScript® language, can include a microprocessor for executing program instructions (including font instructions) stored on a random access memory (RAM) and a read-only memory (ROM) and for controlling a marking engine. The RAM can be supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, or other raster output device capable of producing color or gray scale pixels on paper, film, or other substrate.

The invention has been described in terms of particular embodiments. Other embodiments are within the scope of the following claims. For example, the steps of the invention have been described as being applied to whole page. However, a page may include regions with raster objects and regions with vector objects, and such regions may overlap. Thus, different process steps may be applied to different parts of a single page. Also, the transformations—asymmetric and inverse asymmetric—have been described as single operations defined as compositions of all required transformation components. However, the required transformation components can be applied serially and therefore the execution of the components can be intermingled with other operations without compromising the performance of the total process. The invention can be applied before traps are computed in any context where a minimum trap width vector and a maximum trap width vector have been determined.

What is claimed is:

1. A method for preparing a region of an electronic document for printing on a printing system having asymmetric misregistration behavior comprising:
    defining an asymmetric transformation;
    applying the asymmetric transformation to the region to generate a transformed region;
    processing the transformed region to generate transformed traps;
    applying an inverse transformation to the transformed traps to generate traps for the region, the inverse transformation being an inverse of the asymmetric transformation; and
    using the traps generated for the region to trap the region asymmetrically to compensate for asymmetric misregistration behavior.

2. The method of claim 1, wherein the asymmetric transformation is defined as a transformation matrix and the inverse transformation is defined as a matrix inverse of the transformation matrix.

3. The method of claim 1, wherein defining the asymmetric transformation comprises:
    obtaining a first trap width magnitude and direction, the first trap width being a minimum trap width for the printing system;
    obtaining a second trap width magnitude and direction, the second trap width being a maximum trap width for the printing system;
    defining a rotational component of the asymmetric transformation by determining an angle by which a first axis of a device space has to be rotated to be aligned with the first trap width direction; and
    defining a scaling component of the asymmetric transformation according to a ratio of the first trap width magnitude and the second trap width magnitude.

4. The method of claim 3, wherein the electronic document is represented in a page description language in a user space and the traps for the region are represented in a device space, the method further comprising:
    mapping the traps from device space to user space and adding the mapped traps to the page description language representation of the electronic document.

5. The method of claim 3, wherein the first trap width direction and the second trap width direction are at right angles to each other.

6. The method of claim 3, wherein defining the asymmetric transformation maps a first trap width vector and a second trap width vector to orthonormal basis vectors of a trap-engine space.

7. The method of claim 1, wherein processing the transformed region to generate transformed traps is done by a trap engine generating symmetric traps in a trap-engine space.

8. The method of claim 1, wherein the step of applying the inverse transformation maps the transformed traps from a trap-engine space to a device space.

9. The method of claim 1, wherein the electronic document is represented in a page description language in a user space and the traps for the region are represented in a device space, the method further comprising:
    mapping the traps from device space to user space and adding the mapped traps to the page description language representation of the electronic document.

10. The method of claim 1, wherein:
    the asymmetric transformation maps a resolution-independent representation of the region into a resolution-independent representation of the transformed region;
    a vector-based trapping engine processes the transformed region to generate transformed traps represented as vectors; and
    the inverse transformation maps the transformed traps represented as vectors to a device space.

11. The method of claim 10, further comprising performing peeker detection and removal in device space before applying the asymmetric transformation.

12. The method of claim 1, wherein the printing system comprises a printing device having asymmetric resolution, and defining the asymmetric transformation comprises:
    defining a device component of the asymmetric transformation based on the asymmetric resolution of the printing device.

13. The method of claim 12, wherein defining the asymmetric transformation further comprises:
    obtaining a first trap width magnitude and direction, the first trap width being a minimum trap width for the printing system;
    obtaining a second trap width magnitude and direction, the second trap width being a maximum trap width for the printing system;
    defining a rotational component of the asymmetric transformation by determining an angle by which a first axis of a device space has to be rotated to be aligned with the first trap width direction; and
    defining a scaling component of the asymmetric transformation according to a ratio of the first trap width magnitude and the second trap width magnitude.

14. A computer program product, tangibly stored on a computer-readable medium, for preparing a region of an electronic document for printing on a printing system having asymmetric misregistration behavior by trapping the region asymmetrically to compensate for asymmetric misregistration behavior of a printing system, comprising instructions operable to cause a computer to:
    define an asymmetric transformation;
    apply the asymmetric transformation to the region to generate a transformed region;
    process the transformed region to generate transformed traps; and
    apply an inverse transformation to the transformed traps to generate traps for the region, the inverse transformation being an inverse of the asymmetric transformation.

15. The product of claim 14, wherein the asymmetric transformation is defined as a transformation matrix and the inverse transformation is defined as a matrix inverse of the transformation matrix.

16. The product of claim 14, wherein the instructions to define the asymmetric transformation comprise instructions to:
- obtain a first trap width magnitude and direction, the first trap width being a minimum trap width for the printing system;
- obtain a second trap width magnitude and direction, the second trap width being a maximum trap width for the printing system;
- define a rotational component of the asymmetric transformation by determining an angle by which a first axis of a device space has to be rotated to be aligned with the first trap width direction; and
- define a scaling component of the asymmetric transformation according to a ratio of the first trap width magnitude and the second trap width magnitude.

17. The product of claim 16, wherein the electronic document is represented in a page description language in a user space and the traps for the region are represented in a device space, the product further comprising instructions to:
- map the traps from device space to user space and add the mapped traps to the page description language representation of the electronic document.

18. The product of claim 16, wherein the first trap width direction and the second trap width direction are at right angles to each other.

19. The product of claim 16, wherein defining the asymmetric transformation maps a first trap width vector and a second trap width vector to orthonormal basis vectors of a trap-engine space.

20. The product of claim 14, wherein processing the transformed region to generate transformed traps is done by a trap engine generating symmetric traps in a trap-engine space.

21. The product of claim 14, wherein the step of applying the inverse transformation maps the transformed traps from a trap-engine space to a device space.

22. The product of claim 14, wherein the electronic document is represented in a page description language in a user space and the traps for the region are represented in a device space, the product further comprising instructions to:
- map the traps from device space to user space and add the mapped traps to the page description language representation of the electronic document.

23. The product of claim 14, wherein:
- the asymmetric transformation maps a resolution-independent representation of the region into a resolution-independent representation of the transformed region;
- a vector-based trapping engine processes the transformed region to generate transformed traps represented as vectors; and
- the inverse transformation maps the transformed traps represented as vectors to a device space.

24. The product of claim 23, further comprising performing peeker detection and removal in device space before applying the asymmetric transformation.

25. The product of claim 14, wherein the printing system comprises a printing device having asymmetric resolution, and the instructions to define the asymmetric transformation comprise instructions to:
- define a device component of the asymmetric transformation based on the asymmetric resolution of the printing device.

26. The product of claim 25, wherein the instructions to define the asymmetric transformation further comprise instructions to:
- obtain a first trap width magnitude and direction, the first trap width being a minimum trap width for the printing system;
- obtain a second trap width magnitude and direction, the second trap width being a maximum trap width for the printing system;
- define a rotational component of the asymmetric transformation by determining an angle by which a first axis of a device space has to be rotated to be aligned with the first trap width direction; and
- define a scaling component of the asymmetric transformation according to a ratio of the first trap width magnitude and the second trap width magnitude.

27. A system comprising:
- a printing system having asymmetric misregistration behavior;
- means for defining an asymmetric transformation;
- means for applying the asymmetric transformation to a region of a document to generate a transformed region;
- means for processing the transformed region to generate transformed traps;
- means for applying an inverse transformation to the transformed traps to generate traps for the region, the inverse transformation being an inverse of the asymmetric transformation; and
- means for using the traps generated for the region to trap the region asymmetrically to compensate for the asymmetric misregistration behavior.

28. A computer program product, tangibly stored on a computer-readable medium, for implementing a trap engine, comprising instructions operable to cause a computer to:
- implement an application programming interface operable to receive asymmetry information defining a desired asymmetry of traps; and
- use the asymmetry information to calculate a perpendicular distance a trap extends from an edge with reference to an orientation of the edge on a printed page.

29. The product of claim 28, wherein:
the asymmetry information comprises a minimum trap width vector and a maximum trap width vector.

30. The product of claim 29, further comprising instructions operable to cause a computer to:
use a cross section of an ellipse defined by the minimum trap width vector and the maximum trap width vector, the cross section being taken through the center of the ellipse in a direction perpendicular to the edge, to calculate the perpendicular distance the trap extends from the edge.

* * * * *